United States Patent Office 2,717,209
Patented Sept. 6, 1955

2,717,209
METHOD OF ACCELERATING THE GROWTH OF CHICKS

Charles M. Ely, Springdale, and Stuart Schott, Cincinnati, Ohio, assignors to National Distillers Products Corp., a corporation of Virginia No Drawing. Application April 9, 1952,
Serial No. 281,486

2 Claims. (Cl. 99—4)

This invention is a new and useful method of accelerating the growth of chicks. We have discovered that the growth of chicks is accelerated by admixing the sodium salt of a fatty acid of from 8–18 carbon atoms with the total intake. In the course of numerous experiments we have demonstrated that by the addition to the diet of chicks of from .05–.50% based on the total amount of solid food supplied, air dry basis, we are able to accelerate the growth by several percent.

In one specific experiment in which chicks were fed on a diet containing .25% of sodium stearate, the actual increase in growth based on a final weighing at the age of 70 days as compared to a similar group of chicks fed under identical conditions except for the omission of the sodium stearate, was 13.4%.

The amount to be added is predicated on the amount of solid food supplied, air dry basis, and the actual introduction may be in admixture with such foods supplied to the chicks. The actual food efficiency, i. e., the gain in weight in relation to the total amount of food consumed, does not appear to be affected by the introduction specified. The primary advantage is therefore that a greater output is obtainable in unit time from a single installation and since the chicks will be on the average somewhat larger, the ratio of fat and muscle tissue to bone and offal, is greater.

Even better results in relation to the amount of the additive used are obtained by combining the sodium soap with a quaternary ammonium compound, such as methyl-dodecylbenzyl trimethyl ammonium chloride, or para di-isobutyl phenoxy ethoxy ethyl dimethyl benzyl ammonium chloride monohydrate. These ingredients may be combined in the proportions of sodium soaps from 10–90% of the whole and quaternary ammonium compound from 10–60% of the whole. One specific composition which has been found advantageous consists of sodium soap 70% and quaternary ammonium compound 30%.

We claim:
1. Method of accelerating the growth of chicks which comprises introducing into the solid food consumed by such chicks from .05–.50% of the sodium soap of a fatty acid of from 8–18 carbon atoms based on the amount of solid foods, air dry basis, supplied.
2. Method of accelerating the growth of chicks which comprises introducing into the solid food consumed by such chicks from .05–.50% of sodium stearate based on the amount of solid foods, air dry basis, supplied.

References Cited in the file of this patent
UNITED STATES PATENTS 2,152,438    McHan _____ Mar. 28, 1939

OTHER REFERENCES

Hyamines, Rohm and Haas Company, 1947, pages 3 and 10.